Patented Apr. 27, 1943

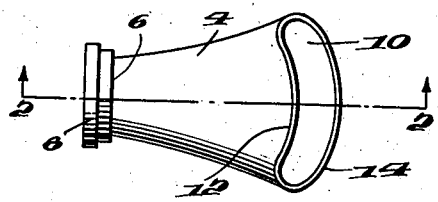
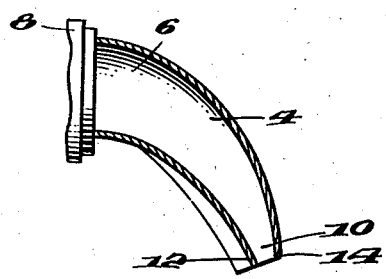
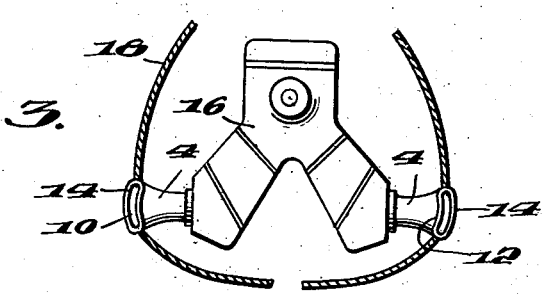
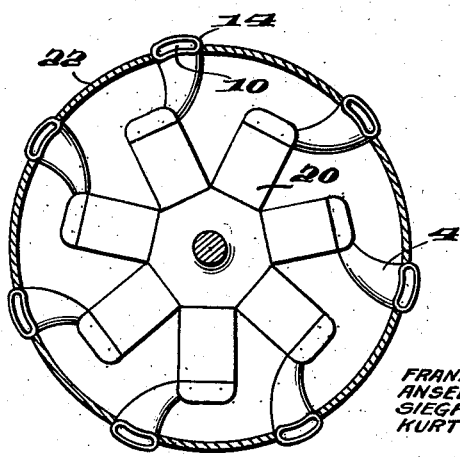

2,317,795

UNITED STATES PATENT OFFICE 2,317,795

REACTION NOZZLE

Franz Neugebauer, Allach, near Munich, Anselm Franz, Dessau-Ziebigk, and Siegfried Decher and Kurt Meissner, Dessau, Germany; vested in the Alien Property Custodian Original application February 23, 1939, Serial No. 258,082, now Patent No. 2,297,239, dated September 29, 1942. Divided and this application March 29, 1940, Serial No. 326,810. In Germany February 25, 1938

1 Claim. (Cl. 60—35.6)

This invention is directed to the construction of a discharge nozzle adapted to be attached to an exhaust manifold of an aircraft engine wherein the reaction pressure of the discharged gases is used to aid in the propulsion of an aircraft.

This application is a division of application Serial No. 258,082, filed February 23, 1939, issued as Patent No. 2,297,239, on September 29, 1942.

It is well known that exhaust gases from an internal combustion engine can be exhausted through a nozzle in order to produce a recoil action to aid in the forward propulsion of an aircraft. The degree of reactive force obtained depends upon the shape and construction of the nozzle. Because of the heat and pressures developed by the burning exhaust gases, considerable difficulty is encountered in properly constructing nozzles of lightweight sheet metal, as the nozzle and particularly the discharge orifice thereof, is subject to distortion by warping under the heat and pressure of the gases. Furthermore, the nozzle is subject to disintegration and wear of the materials forming the nozzle because of the corrosive action of the discharged gases. It is particularly desirable in aircraft construction to construct the nozzles of relatively thin sheet metal in order to minimize the weight of the construction. Improper construction of the nozzles will not only cause them to become inefficient because of the change in shape due to heat and pressure, but furthermore the nozzles may burst and the flying parts injure the aircraft and the passengers contained therein.

It is an object of this invention to construct a thin sheet metal gas exhaust nozzle which will give an efficient recoil action through the discharge of exhaust gases therethrough, and will maintain its shape under the heat and pressure of the gases.

A further object of the invention is to construct a thin sheet metal reaction nozzle which is properly reinforced in order to resist distortion under the heat and pressure of exhaust gases.

A further object of the invention is to construct a seamless, lightweight, thin sheet metal nozzle of such shape as to be reinforced against distortion under the heat and pressure of exhaust gases.

A further object of the invention is to construct a thin sheet metal reaction nozzle having a flattened cross section at the discharge orifice which is reinforced against distortion under the action of hot exhaust gases by being arched.

A further object of the invention is to construct a thin sheet metal reaction nozzle which is shaped to be reinforced against distortion under the heat and pressure of exhaust gases, and at the same time has such a shape as will allow it to conform with an engine cowling so that the drag upon an aircraft is minimized.

Generally these objects of the invention are obtained by constructing at least the discharge orifice end of a nozzle without seams or joints, and preferably by reinforcing the orifice end of the nozzle by flattening the same and then arching the flattened structure transversely of the nozzle so that the arched construction gives a resistance against distortion under the heat and pressure of exhaust gases. The nozzles are attached to the ends of exhaust manifolds coming from the cylinders of an internal engine, the nozzles being directed toward the rear, or at an acute angle toward the rear, of an aircraft so that the exhaust gases emerging from the nozzles give a reactive force which aid in propelling the aircraft forward. The arched construction provides a further advantage in that the orifice end of the nozzle can conform with the shape of the engine cowling, and thus minimizes the drag on the aircraft.

The means by which the objects of the invention are obtained are more fully disclosed in the accompanying drawing, in which:

Fig. 1 is a side elevational view of a nozzle constructed according to the invention.

Fig. 2 is a cross sectional view on the line 2—2 of Fig. 1.

Fig. 3 is an end view partly in section showing the arrangement of the exhaust nozzles in combination with a cylinder-in-line engine and the cowling surrounding the same.

Fig. 4 is a view similar to Fig. 3 but showing the nozzles applied to a radial engine.

In Fig. 1, the exhaust nozzle 4 is constructed from a thin lightweight sheet metal seamless tube. One end 6 of the tube 4 is attached to a base 8 which represents the outlet from an exhaust manifold of an internal combustion engine. End 6 is substantially circular in cross section. From end 6 the tube is gradually flattened toward the outlet orifice 10 and at the same time the tube, as shown, is bent along its longitudinal axis in order that the orifice 10 may be directed toward the rear of the engine. Thus a nozzle is formed which flares outwardly from one end to the other to form a flattened constricted discharge orifice.

In order to reinforce the discharge end of nozzle 4, the flattened sides of the nozzle are arched to produce arched end edges 12 and 14, respectively. This arching gives great rigidity and resistance to deformation of outlet orifice 10 under the heat and pressures of the exhaust gases emitted from the nozzle. Consequently no loss of efficiency in the reactive force produced by the nozzle will take place by reason of the outlet orifice being deformed.

The arching of the outlet end of the nozzle produces a further advantage that the shape of the nozzle can conform with the shape of the cowling surrounding the engine and thus the nozzle and cowling can be arranged so that a minimum drag is produced upon an aircraft.

In Fig. 3, a V-type cylinder-in-line engine 16 is enclosed by a conventional type cowling 18. Each nozzle 4 extends from the engine outwardly with its outlet end orifice 10 directed toward the rear of the engine. Outer edge 14 of the nozzle just projects slightly outwardly of cowling 18, the cowling being joined to the portions of the edges connecting edges 12 and 14. Consequently, substantially no part of the exhaust nozzle projects so far outwardly of the cowling 18 as to cause an additional drag to be produced upon the aircraft, and the streamlined construction of the cowling is substantially maintained.

The same form of construction as shown in Fig. 3 can be applied to a radial engine as illustrated in Fig. 4. In this arrangement the nozzles 4 extend outwardly from the cylinders of radial engine 20 surrounded by the conventional form of cowling 22. As in Fig. 3, the cowling joins the ends of each exhaust nozzle at the edges connecting edges 12 and 14, and edge 14 projects but slightly beyond the outer surface of cowling 22. Therefore the streamline of cowling 22 is substantially unbroken.

It is thus seen that the invention provides for the construction of a thin lightweight sheet metal reaction nozzle which is able to retain its efficient nozzle construction by its reinforced arched construction, in spite of the heat and pressure developed by the incandescent exhaust gases, and furthermore that this shape permits the nozzle to be faired into the shape of a cowling surrounding the engine to which the nozzle is applied.

Having now described means by which the objects of this invention may be obtained, what we claim as new and desire to secure by Letters Patent is:

A recoil action producing exhaust nozzle for an internal combustion engine surrounded by a cowling comprising a thin seamless tubular member substantially cylindrical in cross section at its inner end and having the walls thereof curved and gradually flaring to form a widened, flattened arcuate orifice, the longitudinal edges of the edges of said orifice being disposed in planes substantially parallel to the plane of said cowling, and the end edges of said orifice intersecting the plane of said cowling.

FRANZ NEUGEBAUER.
ANSELM FRANZ.
SIEGFRIED DECHER.
KURT MEISSNER.